(12) United States Patent
Kondo et al.

(10) Patent No.: US 8,733,203 B2
(45) Date of Patent: May 27, 2014

(54) STEERING WHEEL

(75) Inventors: Takashi Kondo, Saitama (JP); Masashi Terada, Saitama (JP); Kunitomo Miyahara, Saitama (JP); Yukihiro Kunitake, Saitama (JP); Shogo Sakaguchi, Tokyo (JP); Norihisa Okada, Tokyo (JP); Keisuke Onohara, Tokyo (JP)

(73) Assignees: Takata Corporation, Tokyo (JP); Honda Motor Co., Ltd., Tokyo (JP)

( * ) Notice: Subject to any disclaimer, the term of this patent is extended or adjusted under 35 U.S.C. 154(b) by 718 days.

(21) Appl. No.: 12/942,830

(22) Filed: Nov. 9, 2010

(65) Prior Publication Data

US 2011/0120258 A1  May 26, 2011

(30) Foreign Application Priority Data

Nov. 23, 2009 (JP) ................................. 2009-265800

(51) Int. Cl.
*B62D 1/11* (2006.01)
*B60Q 5/00* (2006.01)
*B60R 21/201* (2011.01)
*B60R 21/203* (2006.01)

(52) U.S. Cl.
CPC .............. *B60Q 5/003* (2013.01); *B60R 21/201* (2013.01); *B60R 21/2037* (2013.01)
USPC ............................................ 74/552; 280/731

(58) Field of Classification Search
CPC ..................................................... B60Q 5/003
USPC ............................ 74/552; 280/731; 200/61.55

IPC ........................................................... B62D 1/04
See application file for complete search history.

(56) References Cited

U.S. PATENT DOCUMENTS

| 5,410,114 A * | 4/1995 | Furuie et al. ............... 200/61.55 |
| 6,361,065 B1 | 3/2002 | Frisch |
| 2001/0050473 A1 * | 12/2001 | Fujita .............................. 280/731 |
| 2009/0218739 A1 | 9/2009 | Terada et al. |
| 2013/0026741 A1 * | 1/2013 | Onohara ......................... 280/731 |
| 2013/0239739 A1 * | 9/2013 | Miyahara et al. ................ 74/552 |

FOREIGN PATENT DOCUMENTS

| DE | 196 53 684 A1 * | 6/1998 | ............... B62D 1/04 |
| JP | 4-262965 | 9/1992 | |
| JP | 6-270817 | 9/1994 | |
| JP | 2000-225910 | 8/2000 | |
| JP | 2009-202859 | 9/2009 | |
| JP | 2009-248666 | * 10/2009 | ............. B60R 21/20 |
| WO | WO 2012/067131 A1 * | 5/2012 | ............... B62D 1/04 |

* cited by examiner

*Primary Examiner* — Vinh Luong
(74) *Attorney, Agent, or Firm* — Foley & Lardner LLP

(57) ABSTRACT

A steering wheel in which a load exerted on an elastic member constituting a dynamic damper can be reduced, the life of the dynamic damper can be extended, and the assembly operation is readily performed. The steering wheel has a first horn plate (11), a second horn plate (21), guide pins (12), stoppers (13), bushes (14), elastic members (15), and coil springs (16); the bushes (14) are divided into first bushes (141) which have first flanges (14*a*), openings (14*b*), columnar parts (14*c*); and recessed parts (14*d*), and second bushes (142) which have second flanges (14*e*), openings (140, and casings (14*h*); and the columnar parts (14*c*) are configured so as to be in contact with the second flanges (14*e*).

7 Claims, 9 Drawing Sheets

STEERING WHEEL

FIELD OF THE INVENTION

The present invention relates to a steering wheel for steering a vehicle such as automobile, and particularly relates to a steering wheel comprising a dynamic damper.

BACKGROUND OF THE INVENTION

One known example of a steering wheel for steering a vehicle such as automobile has a main body assembled on a steering shaft for converting a rotating action to a steering action and a pad disposed approximately in the center of the main body, wherein the pad is assembled on the main body in a manner that allows the pad to move in the axial direction of the steering shaft, and a horn switch is configured between the main body and the pad (see Japanese Laid-open Patent Publication Nos. 4-262965 and 2009-202859, for example).

The assembly structure of this steering wheel comprises, for example, a first horn plate fixed in place on the main body, guide pins placed upright on the first horn plate, a stoppers disposed on the distal end of the guide pin, a second horn plate fixed in place on the pad and disposed in a manner that allows the second horn plate to slide along the guide pin, a coil spring which is disposed along the guide pin and which biases the second horn plate in a direction which brings the second horn plate in contact with the stopper, and an elastic member disposed between the coil spring and the second horn plate.

A dynamic damper is configured by placing the elastic member between the coil spring and the horn plate as described above. The dynamic damper regulates the characteristic frequency of the pad as an element of mass to negate and damp the vibration transmitted from the main body by the resonance of the pad.

SUMMARY OF THE INVENTION

In the steering wheel disclosed in Japanese Laid-open Patent Publication No. 4-262965 described above, the elastic member is engaged directly with the horn plate and the coil spring, and the elastic member is therefore constantly being compressed by the biasing force of the coil spring. A holding member (bush) for holding the elastic member comprises a casing and flanges formed at the ends of the casing, and the casing and flanges are formed integrally. Therefore, the external shapes of the flanges must be smaller than the opening of the horn plates, thereby leading to the situation where the elastic member is deformable between the holding member and the horn plate. This has resulted in problems wherein the elastic member readily wears down and it is difficult to extend the life of the elastic member.

In the steering wheel disclosed in Japanese Laid-open Patent Publication No. 2009-202859 described above, a slider is inserted between the elastic member and the coil spring, and the biasing force of the coil spring is not directly exerted on the elastic member. Additionally, the external shapes of the flanges of the slider (bush) are formed to be larger than the opening of the horn plate. Therefore, the elastic member is less deformable than the elastic member in Japanese Laid-open Patent Publication No. 4-262965. However, there have been problems in that it is difficult for one of the sliders (bushes) disclosed in Japanese Laid-open Patent Publication No. 2009-202859 in which the casing and flanges are formed integrally to be inserted through the opening of the horn plate, and the assembly operation is troublesome. Further, one of the sliders (bushes) disclosed in Japanese Laid-open Patent Publication No. 2009-202859 which is divided vertically is configured so that the flanges at the ends can move relatively inward, and therefore the elastic member may be compressed between the flanges or between the coil spring and the flanges. Accordingly, there have been problems wherein the elastic member readily wears down and it is difficult to extend the life of the elastic member.

The present invention was devised in view of these problems, and an object thereof is to provide a steering wheel whereby the load exerted on the elastic member constituting the dynamic damper can be reduced, the life of the dynamic damper can be extended, and the assembly operation is easy.

According to the present invention, there is provided a steering wheel comprising a main body assembled on a steering shaft for converting a rotating action into a steering action, and a pad disposed approximately in the center of the main body, the pad being assembled on the main body in a manner that allows the pad to move in an axial direction of the steering shaft, and a horn switch being configured between the main body and the pad; wherein the steering wheel further comprises a first horn plate fixed in place on the main body, a second horn plate fixed in place on the pad, guide pins placed upright on one of either the first horn plate or the second horn plate, stoppers formed at distal ends of the guide pins, bushes fitted slidably along the guide pins, elastic members fitted into the bushes and engaged at the external peripheries with the other of either the first horn plate or the second horn plate, and coil springs fitted around the guide pins so as to bias the bushes toward the stoppers; the bushes are divided into first bushes and second bushes, the first bushes having first flanges which are in contact with the coil springs and which widen in diameter at the external peripheries to positions covering either the first horn plate or the second horn plate, openings through which the guide pins are inserted, a plurality of columnar parts disposed upright at predetermined intervals on the peripheries of the openings, and recessed parts formed between the columnar parts on the peripheries of the openings, and the second bushes having second flanges placed opposite the first flanges, openings through which the guide pins are inserted, and casings which are disposed upright on the peripheries of the openings so as to mesh with the columnar parts and which have hooks formed at the distal ends so as to engage with the recessed parts; and the columnar parts are configured so as to be in contact with the second flanges.

The bushes may be configured such that the columnar parts and the casing are formed to differ in outside diameter, uneven parts are formed by the external shapes of the columnar parts and the casings when the first bushes and the second bushes are joined together, and the elastic members have internal edges which engage with the uneven parts.

The bushes may also have interlocking parts for interlocking with the coil springs. Furthermore, the surfaces of the first flanges may have convex parts which are in contact with the first horn plate or the second horn plate engaged with the elastic members. At this time, the elastic members preferably have recessed parts in their outside edges to allow the convex parts to be inserted therethrough.

The first horn plate or the second horn plate may have circular openings through which the guide pins can be inserted, the external peripheries of the elastic members may have substantially annular grooves which can engage with openings, and collars may be disposed between the openings and the grooves. Furthermore, the steering wheel according to claim 6 is characterized in that the first horn plate or the second horn plate has through-holes formed on the peripheries of the openings, and the collars are insert molded along the openings so as to engage with the through-holes.

With the steering wheel according to the present invention described above, the bushes are divided into first bushes and second bushes, and columnar parts in contact with the second bushes are formed on the first bushes, whereby the operation of assembling the dynamic dampers can be performed easily, the load of the first bushes can be received by the second bushes, the load imposed on the elastic members can be reduced, and the life of the dynamic dampers can be extended.

By forming uneven parts in the portions of the bush that fit with the elastic members to fit the elastic members therein, rotation of the elastic members in the circumferential direction of the guide pins can be suppressed, abrasion of the elastic members can be reduced, and the life of the dynamic dampers can be extended.

By forming interlocking parts for interlocking with the coil springs on the bushes, the coil springs can be interlocked with the bushes so that the coil springs do not fall off during the operation of assembling the dynamic dampers, and the assembling operation can be performed easily.

Furthermore, by forming convex parts in contact with the horn plate in the flanges of the bushes on the sides facing the coil springs, which support the elastic members, the biasing force of the coil springs can be received by the horn plate, the load imposed on the elastic members can be reduced, and the life of the dynamic dampers can be extended.

By forming recessed parts in the outer edges of the elastic members to allow the convex parts to pass through, the convex parts can be made to be in contact with the horn plate without enlarging the flanges in diameter. Particularly by forming recessed parts through to both the sides facing the first flanges and the sides facing the second flanges, the elastic members can be formed into front-to-back symmetrical shapes, the dynamic dampers can be assembled without regard to the front and back sides of the elastic members during the operation of assembling the dynamic dampers, and the assembling operation can be performed easily.

By disposing collars between the elastic members and the horn plates, the abrasion inflicted on the elastic members by the edges of the horn plates can be reduced, and the life of the dynamic dampers can be extended.

By insert molding the collars and engaging them with the through-holes formed in proximity to the openings of the horn plate, the collars and the horn plate can be formed integrally, the collars can be configured so as to not rotate along the openings, abrasion inflicted on the elastic members by the rotation of the collars can be reduced, and the life of the dynamic dampers can be extended.

BRIEF DESCRIPTION OF THE DRAWINGS

FIG. 2 is an enlarged view of a dynamic damper shown in the first embodiment, wherein

FIG. 3 is a detailed view of a bush shown in the first embodiment, wherein

FIG. 4 is a detailed view of an elastic member shown in the first embodiment, wherein

FIG. 5 is a drawing showing a second embodiment of the steering wheel according to the present invention, wherein

FIG. 6 is a drawing showing an insert molded collar, wherein

FIG. 7 is a drawing showing other embodiments of the steering wheel according to the present invention, wherein

DETAILED DESCRIPTION OF THE PREFERRED EMBODIMENTS

Figure 1:
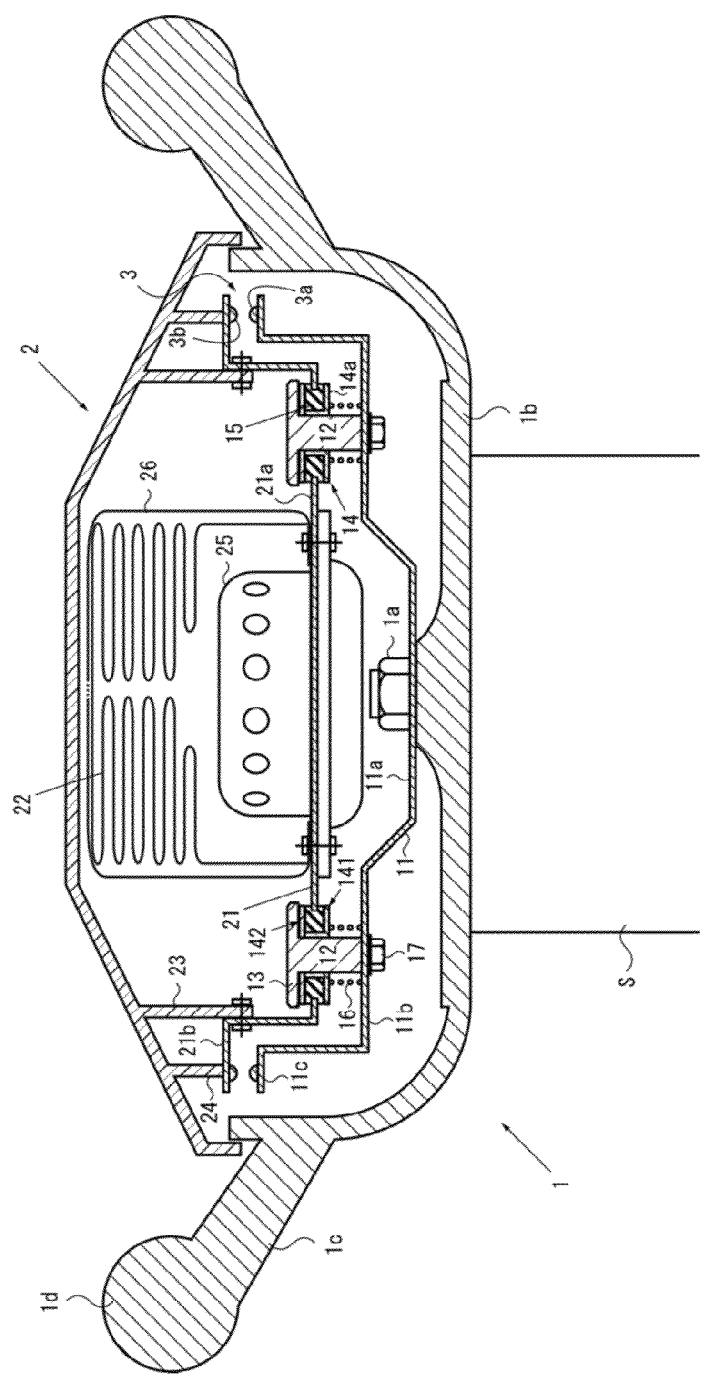
FIG. 1 is a cross-sectional view showing a first embodiment of the steering wheel according to the present invention.
Figure 2A:
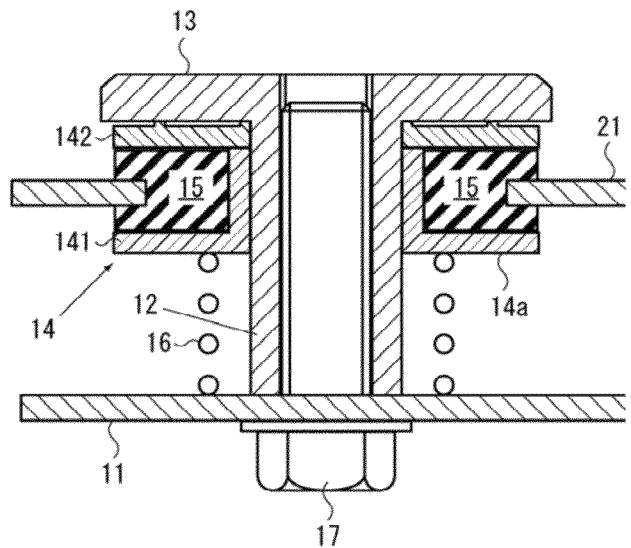
FIG. 2(A) is a view during the normal state and FIG. 2(B) is a view when the horn is sounded.
Figure 2B:
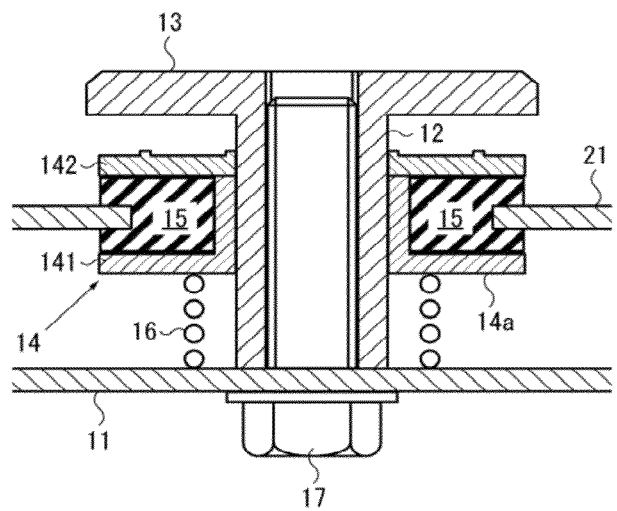

Embodiments of the present invention are described hereinbelow using FIGS. 1 to 7. FIG. 1 is a cross-sectional view showing the first embodiment of the steering wheel according to the present invention. FIG. 2 is an enlarged view of the dynamic damper shown in the first embodiment, wherein FIG. 2(A) shows the normal state of the dynamic damper, and FIG. 2(B) shows the dynamic damper when the horn is sounded.

As shown in FIGS. 1-3, the steering wheel according to the present invention is a steering wheel having a main body 1 assembled on a steering shaft S for converting a rotating action into a steering action, and a pad 2 disposed approximately in the center of the main body 1, the pad 2 being assembled on the main body 1 in a manner that allows the pad 2 to move in the axial direction of the steering shaft S, and a horn switch 3 being configured between the main body 1 and the pad 2. The steering wheel also has a first horn plate 11 fixed in place on the main body 1, a second horn plate 21 fixed in place on the pad 2, guide pins 12 placed upright on the first horn plate 11, stoppers 13 formed at the distal ends of the guide pins 12, bushes 14 fitted slidably along the guide pins 12, elastic members 15 fitted into the bushes 14 and engaged at the external peripheries with the second horn plate 21, and coil springs 16 fitted around the guide pins 12 so as to bias the bushes 14 toward the stoppers 13. The bushes 14 are divided into first bushes 141 and second bushes 142, the first bushes 141 having first flanges 14*a* which are in contact with the coil springs 16 and which widen in diameter at the external peripheries to positions covering the second horn plate 21, openings 14*b* through which the guide pins 12 are inserted, a plurality of columnar parts 14*c* disposed upright at predetermined intervals on the peripheries of the openings 14*b*, and recessed parts 14*d* formed between the columnar parts 14*c* on the peripheries of the openings 14*b*, and the second bushes 142 having second flanges 14*e* placed opposite the first flanges 14*a*, openings 14*f* through which the guide pins 12 are inserted, and casings 14*h* which are disposed upright on the peripheries of the openings 14*f* so as to mesh with the columnar parts 14*c* and which have hooks 14*g* formed at the distal ends so as to engage with the recessed parts 14*d*. The columnar parts 14*c* are configured so as to be in contact with the second flanges 14*e*.

The main body 1 has a boss 1*b* fixed to the steering shaft S by an attachment 1*a*, a plurality of spokes 1*c* extending in the diameter direction from the boss 1*b*, and an annular rim 1*d* coupled to the spokes 1*c*. The attachment 1*a* also functions as fixing means for fixing the first horn plate 11 to the boss 1*b*. The method for fixing the first horn plate 11 to the main body 1 is not limited to the method illustrated; an arm part for fixing the main body 1 may be formed on the external periphery of the first horn plate 11. This configuration of the main body 1 is essentially the same as the conventional configuration, and other details will therefore not be described.

The pad 2 is disposed approximately in the center of the steering wheel, and is a component for housing an airbag 22. The pad 2 is generally molded from a resin, and is configured so as to tear at a thin part formed in the reverse surface when the airbag 22 is inflated and deployed. The pad 2 has a wall surface 23 to which the second horn plate 21 is fixed, and a supporting part 24 in contact with the second horn plate 21. Furthermore, an inflator 25 for supplying gas to the airbag 22 is fixed approximately in the center of the second horn plate 21 fixed to the pad 2. The airbag 22 is fixed to the second horn plate 21 together with the inflator 25, and is housed in a folded state within the pad 2. The airbag 22 may be enclosed by a wrapping sheet 26.

The first horn plate 11 has a first flat section 11$a$ fixed to the boss 1$b$ by the attachment 1$a$, a second flat section 11$b$ on which the guide pins 12 are placed upright, and a third flat section 11$c$ on which fixed contact points 3$a$ of the horn switch 3 are disposed. For example, the first flat section 11$a$ is disposed approximately in the center of the first horn plate 11, the second flat section 11$b$ is disposed in three locations (e.g., at 3 o'clock, 6 o'clock, and 9 o'clock) so as to surround the airbag 22, and the third flat section 11$c$ is disposed in three locations (e.g., at 3 o'clock, 6 o'clock, and 9 o'clock) adjacent to the outer sides of the second flat section 11$b$.

The second horn plate 21 has a first flat section 21$a$ on which the inflator 25 is fixed, and second flat sections 21$b$ on which movable contact points 3$b$ of the horn switch 3 are disposed. Formed in the first flat section 21$a$ are an opening 21$c$ through which part of the inflator 25 is inserted, and circular openings 21$d$ through which the guide pins 12 can be inserted, the openings 21$d$ being formed in three locations (e.g., 3 at o'clock, 6 o'clock, and 9 o'clock) so as to surround0p—the opening 21$c$ (see FIG. 6).

The main body 1 and the pad 2 described above are configured so as to be movable in the axial direction of the steering shaft S and to reduce their vibration by the dynamic damper comprising the guide pins 12, the stoppers 13, the bushes 14, the elastic members 15, and the coil springs 16. The configuration of the dynamic damper is described in detail hereinbelow with reference to FIG. 2.

As shown in FIG. 2, the guide pins 12 are configured in the shapes of nuts formed integrally with the stoppers 13, and fixing bolts 17 are threaded to clamp the first horn plate 11 from the other side, fixing the guide pins 12 to the first horn plate 11. The stoppers 13 are formed integrally at the distal ends of the guide pins 12 and comprise flanges whose diameters are wider than the guide pins 12.

Figure 3A:
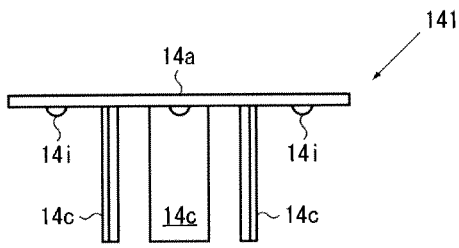
FIG. 3(A) is a side view of a first bush.
Figure 3B:
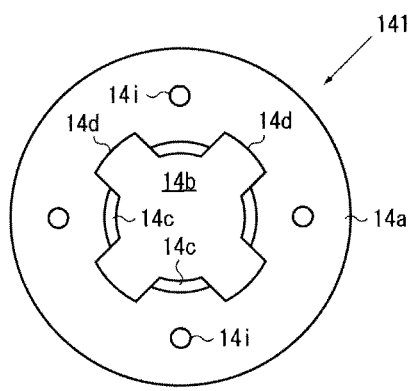
FIG. 3(B) is a view indicated by arrow B in FIG. 3(A)
Figure 3C:
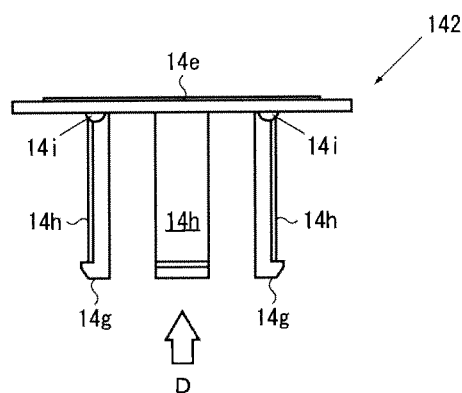
FIG. 3(C) is a side view of a second bush.
Figure 3D:
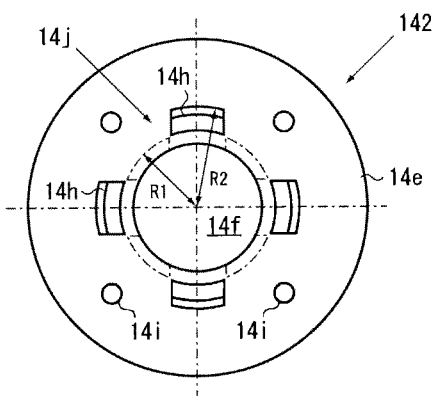
FIG. 3(D) is a view indicated by arrow D in FIG. 3(C).

FIG. 3 is a detailed view of a bush 14 shown in the first embodiment, wherein FIG. 3(A) is a side view of a first bush 141, FIG. 3(B) is a view as indicated by arrow B in FIG. 3(A), FIG. 3(C) is a side view of a second bush 142, and FIG. 3(D) is a view as indicated by arrow D in FIG. 3(C).

Each of the first bushes 141 has a first flange 14$a$ in the shape of a disc, and an opening 14$b$ and recessed parts 14$d$ formed in the center, as shown in FIGS. 3(A) and (B). The recessed parts 14$d$ are formed into a substantial cross shape in communication with the opening 14$b$. Columnar parts 14$c$ are disposed alternating with the recessed parts 14$d$ on the peripheral edge of the opening 14$b$. On the inside surface of the first flange 14$a$, a plurality of (e.g., four) projections 14$i$ are formed for pressing one of the elastic members 15.

Each of the second bushes 142 has a second flange 14$e$ in the shape of a disc, and a circular opening 14$f$ formed in the center as shown in FIGS. 3(C) and (D). Casings 14$h$ are formed and positions farther out in the diameter direction than the peripheral edge of the opening 14$f$. On the inside surface of the second flange 14$e$, a plurality of (e.g., four) projections 14$i$ are formed for pressing one of the elastic members 15.

The bush 14 is assembled by inserting the casings 14$h$ of the second bush 142 through the recessed parts 14$d$ of the first bush 141 and engaging the hooks 14$g$ with the external surface of the first flange 14$a$. At this time, the columnar parts 14$c$ of the first bush 141 are inserted between the casings 14$h$, and the distal ends are in contact with the second flange 14$e$ as shown by the single-dotted lines in FIG. 3(D). Therefore, when the first bush 141 and the second bush 142 have been coupled together and the bush 14 has been assembled, the columnar parts 14$c$ function as stoppers and the gap between the first flange 14$a$ and the second flange 14$e$ will never be smaller than the height of the columnar parts 14$c$, even when an external load is exerted on the bush 14. That is, even when an external load is exerted on the bush 14, an excessive load will never be exerted on the elastic member 15 fitted into the gap between the first flange 14$a$ and the second flange 14$e$.

In each of the bushes 14, as shown in FIG. 3(D), the outside diameter R1 of the columnar parts 14$c$ and the outside diameter R2 of the casings 14$h$ are formed to be different sizes (R2>R1 herein), and when the first bush 141 and the second bush 142 are joined together, uneven parts 14$j$ are formed by the external shapes of the columnar parts 14$c$ and the casings 14$h$. The abrasion between these uneven parts 14$j$ and the elastic member 15 can be further reduced by making the gaps formed between the columnar parts 14$c$ and the casings 14$h$ as small as possible.

The elastic members 15 are rubber-molded components attached between the first flanges 14$a$ and the second flanges 14$e$ of the bushes 14 comprising the first bushes 141 and the second bushes 142, as shown in FIG. 2. FIG. 4 is a detailed view of an elastic member 15, wherein FIG. 4(A) is a plan view, FIG. 4(B) is a cross-sectional view along line B-B in FIG. 4(A), FIG. 4(C) shows a state of the elastic member assembled with a second bush 142, and FIG. 4(D) shows a state of the elastic member assembled with the first bush 141.

Figure 4A:
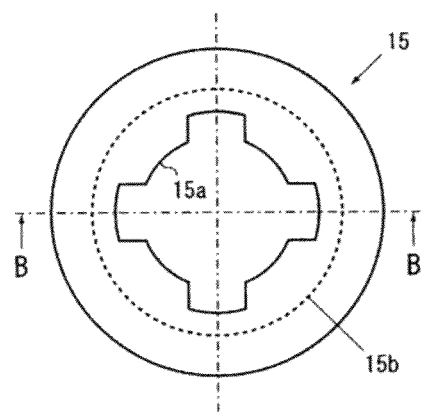
FIG. 4(A) is a plan view.
Figure 4B:
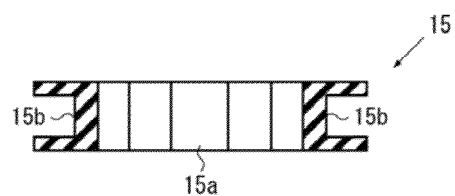
FIG. 4(B) is a cross-sectional view along line B-B in FIG. 4(A)

As shown in FIGS. 4(A) and (B), each of the elastic members 15 has a thin, flat, substantially cylindrical shape, and also has an internal edge 15$a$ in the center which engages with the uneven parts 14$j$ of a bush 14. In the external periphery of the elastic member 15 is formed a substantially annular groove 15$b$ engageable with an opening 21$d$ of the second horn plate 21.

Figure 4C:
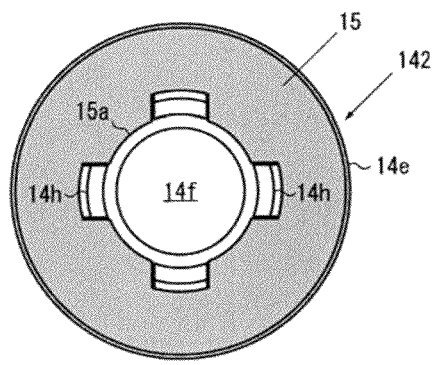
FIG. 4(C) shows a state of assembly with a second bush.
Figure 4D:
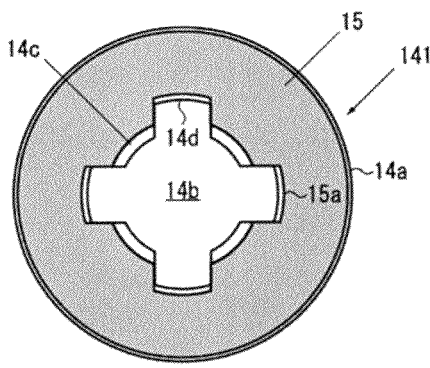
FIG. 4(D) shows a state of assembly with a first bush.

As shown in FIG. 4(C), when the elastic member 15 is joined to the second bush 142, the internal edge 15$a$ of the elastic member 15 engages with the casings 14$h$, leading to a circumferentially non-rotatable state. As shown in FIG. 4(D), when the elastic member 15 is joined to the first bush 141, the internal edge 15$a$ of the elastic member 15 is disposed along the reverse sides of the columnar parts 14$c$.

As shown in FIG. 2(A), the coil springs 16 are inserted between the bushes 14 and the first horn plate 11. The coil springs 16 are in contact with the first flanges 14$a$ of the bushes 14 and bias the bushes 14 to press against the stoppers 13. Since the columnar parts 14$c$ are formed on the bushes 14 as described above, the load of the first bushes 141 can be received by the second bushes 142, and since the first flanges 14$a$ and the second flanges 14$e$ are configured so as to be non-movable inwardly relative to each other (so that their gap does not decrease), the load exerted on the elastic members 15 can be reduced.

As shown in FIG. 2(B), when the horn is sounded, the pressing of the pad 2 causes the second horn plate 21 to move toward the main body 1, and at the same time the bushes 14 also move along the guide pins 12 toward the main body 1. The movable contact points 3b formed on the second horn plate 21 then contact with the fixed contact points 3a formed on the first horn plate 11 shown in FIG. 1, causing the horn switch 3 to operate and produce a sound.

Figure 5A:
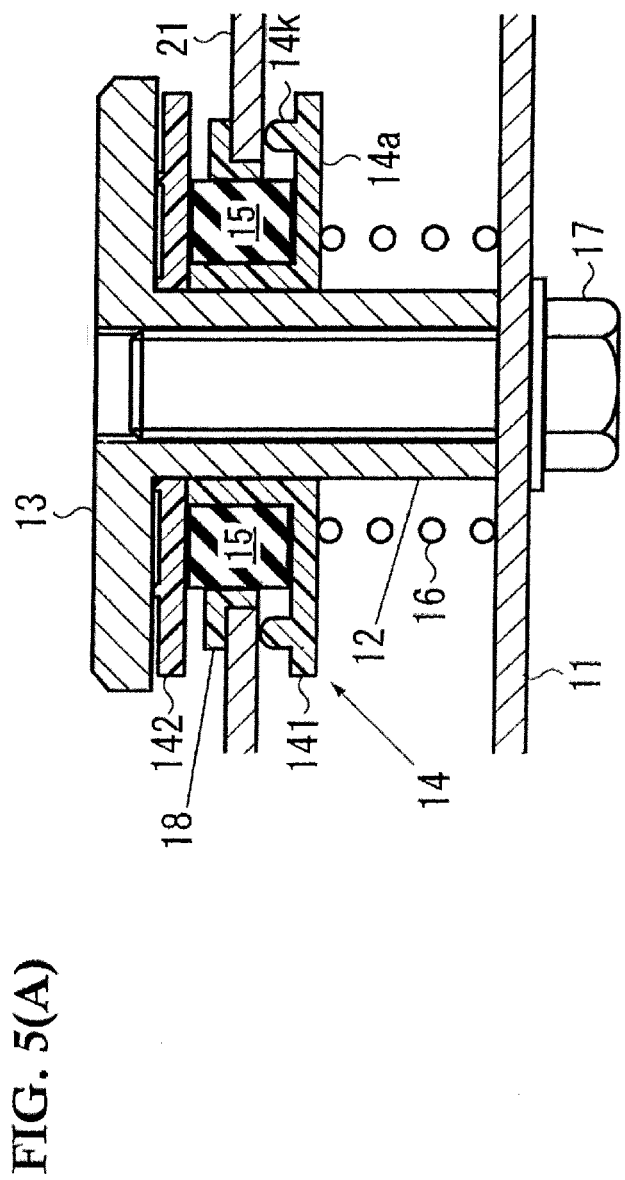
FIG. 5(A) is an enlarged view of a dynamic damper.
Figure 5B:
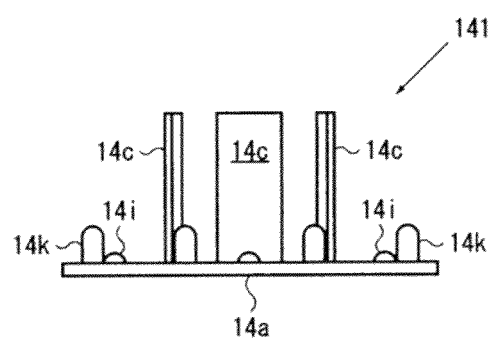
FIG. 5(B) is a side view of a first bush.
Figure 5C:
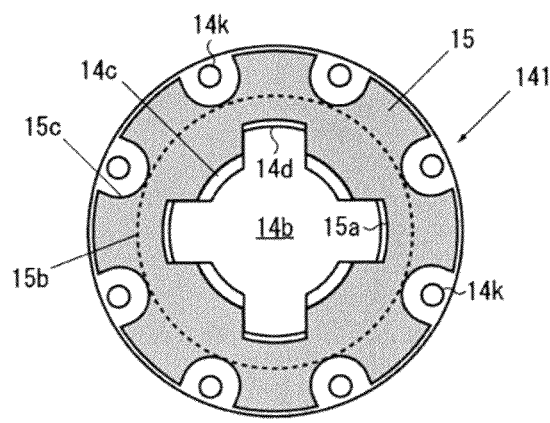
FIG. 5(C) shows an assembled state of an elastic member and a first bush.

Next, a second embodiment of the steering wheel according to the present invention will be described. FIG. 5 is a drawing showing the second embodiment of the steering wheel according to the present invention, wherein FIG. 5(A) is an enlarged view of the dynamic damper, FIG. 5(B) is a side view of a first bush, and FIG. 5(C) shows an elastic member and a first bush in an assembled state. Components identical to those of the first embodiment described above are denoted by the same symbols, and redundant descriptions are omitted.

As shown in FIGS. 5(A) and (B), with the dynamic damper of the second embodiment, each of the bushes 14 has convex parts 14k on the surface of the first flange 14a, the convex parts 14k being in contact with the second horn plate 21 engaged with the elastic members 15. A plurality of these convex parts 14k are disposed, e.g., at fixed intervals on the external periphery of the inside surface of the first flange 14a.

As shown in FIG. 5(C), on the external periphery of each of the elastic members 15 are formed recessed parts 15c, through which the convex parts 14k of the bushes 14 are inserted. These recessed parts 15c are functionally sufficient if formed at least only on the side facing the first bush 141 where the convex parts 14k are formed. However, the elastic member 15 can be formed into a shape having front-to-back symmetry by forming the recessed parts 15c through to the side facing the second bush 142 where the convex parts 14k are not formed, the dynamic damper can be assembled without regard to the front and back of the elastic member 15 during the operation of assembling the dynamic damper, and the assembling operation can be performed easily.

In this second embodiment, since the convex parts 14k in contact with the second horn plate 21 are formed on each of the bushes 14, the biasing force of the coil springs 16 can be received by the second horn plate 21, and the elastic members 15 are not compressed by the biasing force of the coil springs 16.

As shown in FIG. 5(A), a collar 18 is disposed between each of the openings 21d of the second horn plate 21 and each of the grooves 15b of the elastic members 15. The collars 18 are components molded from a resin or rubber, and are fitted into the openings 21d of the second horn plate 21 when the dynamic dampers are assembled. By placing these collars 18, the abrasion inflicted on the elastic members 15 by the edges of the second horn plate 21 can be reduced.

The collars 18 may also be insert molded into the openings 21d of the second horn plate 21. FIG. 6 is a drawing showing collars that have been insert molded, wherein FIG. 6(A) is a plan view of the second horn plate before the insert molding, and FIG. 6(B) is a plan view of the second horn plate after the insert molding.

Figure 6A:
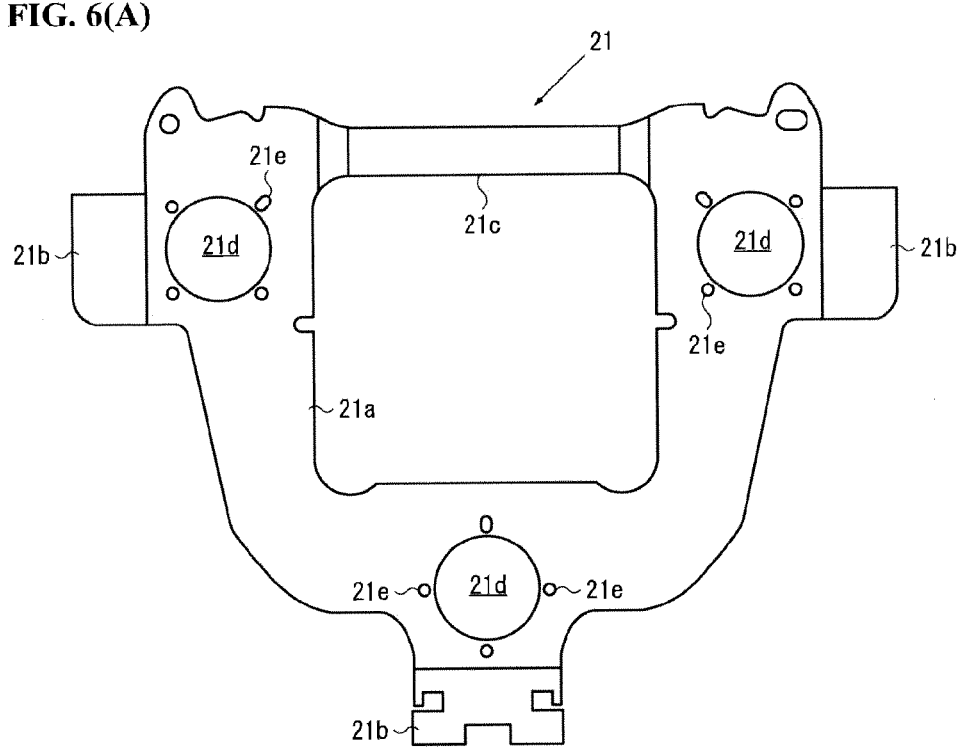
FIG. 6(A) is a plan view of the second horn plate before the insert molding.

As shown in FIG. 6(A), the second horn plate 21 has an opening 21c approximately in the center, and a first flat section 21a is formed around the external periphery of the opening. The openings 21d are formed in three locations in the first flat section 21a, and a plurality of through-holes 21e are formed on the peripheries of each of the openings 21d. Some of the through-holes 21e are formed to be somewhat larger in order to improve the fluidity of the resin during insert molding.

Figure 6B:
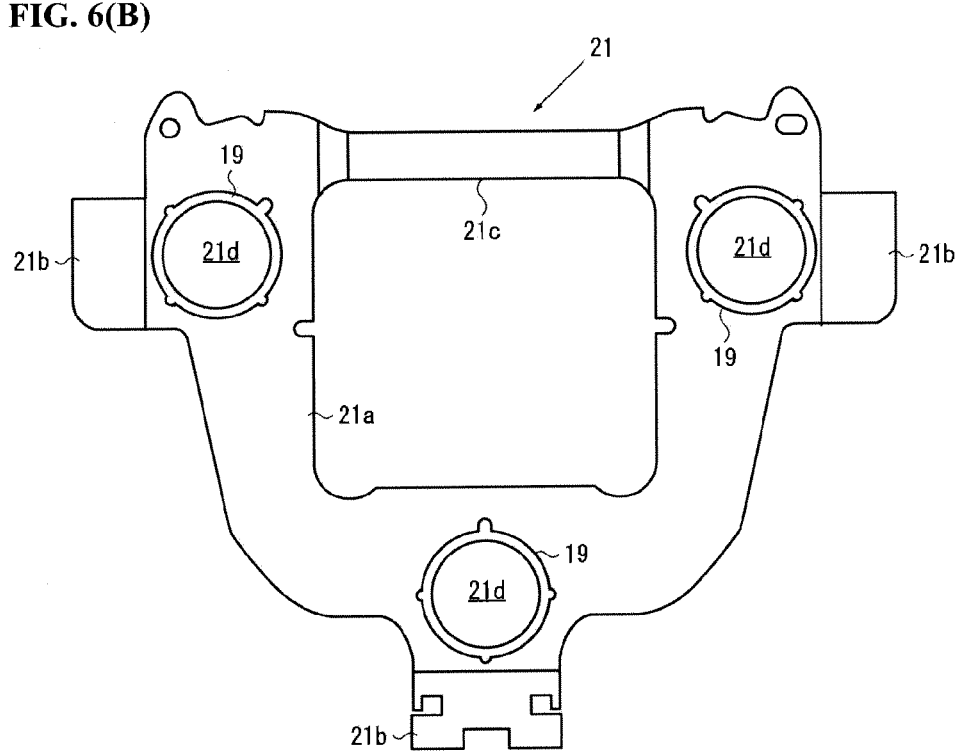
FIG. 6(B) is a plan view of the second horn plate after the insert molding.

A die for covering the through-holes 21e and the openings 21d is then put in place and is filled with a resin, whereby the collars 18 are insert-molded along the openings 21d so as to engage with the through-holes 21e as shown in FIG. 6(B). By insert-molding the collars 18 in this manner, the collars 18 and the second horn plate 21 can be formed integrally, the collars 18 can be configured so as to not rotate along the openings 21d, and the abrasion inflicted on the elastic members 15 by the rotation of the collars 18 can be reduced.

Figure 7A:
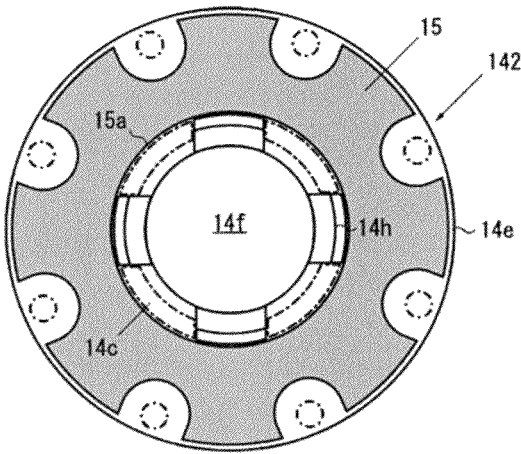
FIG. 7(A) shows the third embodiment.
Figure 7B:
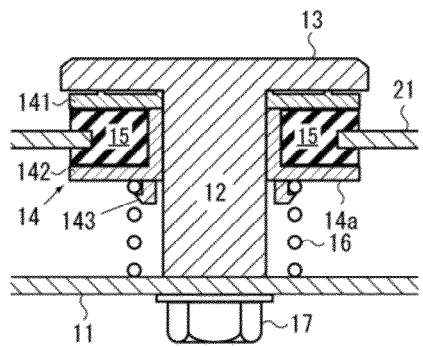
FIG. 7(B) shows the fourth embodiment.
Figure 7D:
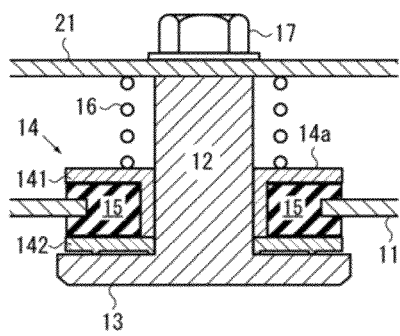
FIG. 7(D) shows the sixth embodiment.
Figure 7C:
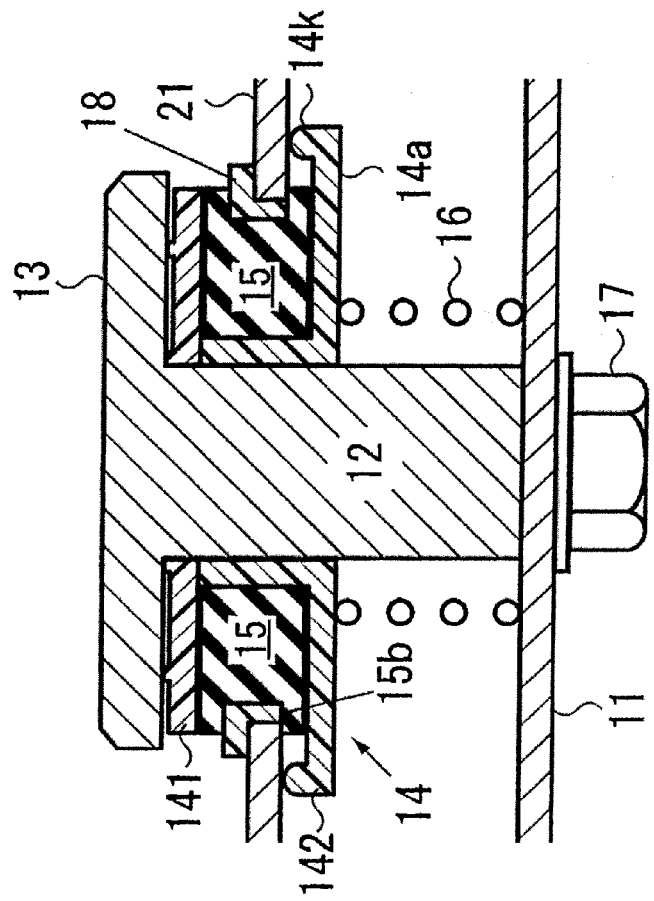
FIG. 7(C) shows the fifth embodiment.

Next, other embodiments of the steering wheel according to the present invention will be described. FIG. 7 is a drawing showing other embodiments of the steering wheel according to the present invention, wherein FIG. 7(A) is a third embodiment, FIG. 7(B) is a fourth embodiment, FIG. 7(C) is a fifth embodiment, and FIG. 7(D) is a sixth embodiment. Components identical to those of the first or second embodiment described above are denoted by the same symbols and redundant descriptions are omitted.

In the third embodiment shown in FIG. 7(A), the bushes 14 do not have uneven parts 14j, and the internal edges 15a of the elastic members 15 are formed into circular shapes. Specifically, the casings 14h are formed along the openings 14f of the second bushes 142, and the external shapes of the columnar parts 14c of the first bushes 141 as well as the external shapes of the casings 14h of the second bushes 142 are configured so as to constitute circular shapes when the first bushes 141 and the second bushes 142 are combined as shown by the single-dotted lines. In this third embodiment, the effect of suppressing the circumferential rotation of the elastic members 15 is less than in the first embodiment or second embodiment, but the effects of the columnar parts 14c and the convex parts 14k can be achieved. A case is shown here in which the second embodiment is used as a base, but the first embodiment may also be used as a base, as shall be apparent.

In the fourth embodiment shown in FIG. 7(B), interlocking parts 143 for interlocking with the coil springs 16 are formed on the bushes 14. Specifically, a plurality of hook-shaped interlocking parts 143 are disposed upright on the external surfaces of the first flanges 14a of each of the first bushes 141. According to this fourth embodiment, by forming the interlocking parts 143, the coil springs 16 can be interlocked with the bushes 14 so that the coil springs 16 do not fall off when the dynamic dampers are assembled, and the assembling operation can be performed easily. A case is shown here in which the interlocking parts 143 are formed on the bushes 14 of the first embodiment, but the interlocking parts 143 may also be formed on the bushes 14 of the second embodiment, as shall be apparent.

In the fifth embodiment shown in FIG. 7(C), the first flanges 14a are enlarged in diameter past the outsides of the elastic members 15, and the convex parts 14k are made to be in contact with the second horn plate 21. In this fifth embodiment, recessed parts 15c for allowing the convex parts 14k to be inserted do not need to be formed in the elastic members 15, and the steps of manufacturing the elastic members 15 can be simplified.

In the sixth embodiment shown in FIG. 7(D), the guide pins 12 are disposed upright in the second horn plate 21, and the elastic members 15 are engaged with the first horn plate 11. In this sixth embodiment, the dynamic dampers shown in the first embodiment are installed upside-down on the first horn plate 11 and the second horn plate 21. The similar effects as those of the first embodiment are achieved in this sixth embodiment. The dynamic dampers shown in the second through fifth embodiments may also be turned upside-down, as shall be apparent.

The present invention is not limited to the embodiments described above; as shall be apparent, various modifications can be made within a range that does not deviate from the scope of the present invention, such as using appropriate combinations of the first through sixth embodiments.

What is claimed is:

1. A steering wheel comprising:
   a main body assembled on a steering shaft for converting a rotating action into a steering action; and
   a pad disposed approximately in the center of the main body, the pad being assembled on the main body in a manner that allows the pad to move in an axial direction of the steering shaft, and a horn switch being configured between the main body and the pad;
   wherein the steering wheel further comprises:
      a first horn plate fixed in place on the main body;
      a second horn plate fixed in place on the pad;
      guide pins placed upright on one of either the first horn plate or the second horn plate;
      stoppers formed at distal ends of the guide pins;
      bushes fitted slidably along the guide pins;
      elastic members fitted into the bushes and engaged at the external peripheries with the other of either the first horn plate or the second horn plate; and
      coil springs fitted around the guide pins so as to bias the bushes toward the stoppers;
   wherein the bushes are divided into first bushes and second bushes, the first bushes having first flanges which are in contact with the coil springs and which widen in diameter at the external peripheries so as to cover either the first horn plate or the second horn plate, openings through which the guide pins are inserted, a plurality of columnar parts disposed upright at predetermined intervals on the peripheries of the openings, and recessed parts formed between the columnar parts on the peripheries of the openings;
   wherein the second bushes having second flanges placed opposite the first flanges, openings through which the guide pins are inserted, and casings which are disposed upright on the peripheries of the openings so as to mesh with the columnar parts and which have hooks formed at the distal ends; and
   wherein the bushes are assembled by inserting the casings of the second bushes through the recessed parts of the first bushes and engaging the hooks with an external surface of the first flange, and the columnar parts of the first bushes are configured to be in contact with an inner surface of the second flange.

2. The steering wheel according to claim 1, wherein the bushes are configured such that the columnar parts and the casing are formed to differ in outside diameter, uneven parts are formed by the external shapes of the columnar parts and the casings when the first bushes and the second bushes are joined together, and the elastic members have internal edges which engage with the uneven parts.

3. The steering wheel according to claim 1, wherein the bushes have interlocking parts which interlock with the coil springs.

4. The steering wheel according to claim 1, wherein the bushes are configured such that the surfaces of the first flanges have convex parts which are in contact with the first horn plate or the second horn plate engaged with the elastic members.

5. The steering wheel according to claim 4, wherein the elastic members have recessed parts in the outside edges thereof to allow the convex parts to be inserted therethrough.

6. The steering wheel according to claim 1, wherein the first horn plate or the second horn plate has circular openings through in which the guide pins are inserted, the external peripheries of the elastic members have substantially annular grooves configure to engage with the openings, and collars are disposed between the openings and the grooves.

7. The steering wheel according to claim 6, wherein the first horn plate or the second horn plate has through-holes formed on the peripheries of the openings, and the collars are insert molded along the openings so as to engage with the through-holes.

* * * * *